United States Patent
Subramanian et al.

(10) Patent No.: US 7,121,448 B2
(45) Date of Patent: Oct. 17, 2006

(54) FRICTION STIR WELDING APPARATUS AND ASSOCIATED THERMAL MANAGEMENT SYSTEMS AND METHODS

(75) Inventors: Pazhayannur Ramanathan Subramanian, Niskayuna, NY (US); Earl Claude Helder, Cincinnati, OH (US); Timothy Joseph Trapp, Upper Arlington, OH (US); Mark Lawrence Hunt, Greenville, SC (US); Timothy V Stotler, Columbus, OH (US)

(73) Assignee: General Electric Company, Niskayuna, NY (US)

( * ) Notice: Subject to any disclaimer, the term of this patent is extended or adjusted under 35 U.S.C. 154(b) by 325 days.

(21) Appl. No.: 10/651,397

(22) Filed: Aug. 29, 2003

(65) Prior Publication Data

US 2005/0045694 A1    Mar. 3, 2005

(51) Int. Cl.
B23K 20/12    (2006.01)
B23K 37/00    (2006.01)
B23K 31/02    (2006.01)

(52) U.S. Cl. .................................. 228/2.1; 228/112.1
(58) Field of Classification Search ............... 228/2.1, 228/112.1
See application file for complete search history.

(56) References Cited

U.S. PATENT DOCUMENTS

| | | | | |
|---|---|---|---|---|
| 5,156,316 A * | 10/1992 | Nied et al. | ..................... | 228/2.1 |
| 5,460,317 A * | 10/1995 | Thomas et al. | ............ | 228/112.1 |
| 6,168,066 B1 * | 1/2001 | Arbegast | ..................... | 228/102 |
| 6,360,937 B1 * | 3/2002 | De Koning | .............. | 228/112.1 |
| 6,516,992 B1 * | 2/2003 | Colligan | ................... | 228/112.1 |
| 6,866,181 B1 * | 3/2005 | Aota et al. | ................ | 228/112.1 |
| 2003/0116608 A1 * | 6/2003 | Litwinski | .................. | 228/112.1 |
| 2004/0134971 A1 * | 7/2004 | Narita et al. | .............. | 228/112.1 |
| 2004/0173662 A1 * | 9/2004 | Christner | .................. | 228/112.1 |
| 2005/0029330 A1 * | 2/2005 | Kohn | ....................... | 228/112.1 |

FOREIGN PATENT DOCUMENTS

| | | | | |
|---|---|---|---|---|
| JP | 2001205459 | A | * | 7/2001 |
| JP | 2003094175 | A | * | 4/2003 |
| JP | 2004174507 | A | * | 6/2004 |
| WO | WO 99/39861 | | | 8/1999 |

* cited by examiner

*Primary Examiner*—Lynne Edmondson
(74) *Attorney, Agent, or Firm*—Paul J. DiConza; William E. Powell, III (57) ABSTRACT

The present invention provides a friction stir welding apparatus and associated thermal management systems and methods for joining one or more similar or dissimilar materials forming a workpiece along a joint to be welded. The friction stir welding apparatus includes a pin tool apparatus selectively disposed adjacent to and in direct contact with a first surface of the workpiece along the joint to be welded and a heating member disposed adjacent to a second surface of the workpiece along the joint to be welded, the heating member operable for controllably heating at least a portion of the workpiece adjacent to the joint to be welded. The friction stir welding apparatus also includes an annular spindle having an interior portion and an axis, the interior portion of the annular spindle at least partially defining one or more cooling channels, the one or more cooling channels operable for containing a cooling fluid. The friction stir welding apparatus further includes a shoulder disposed adjacent to the annular spindle and substantially aligned with the axis of the annular spindle and a pin tool disposed adjacent to the shoulder and substantially aligned with the axis of the annular spindle. The cooling fluid is operable for cooling at least one of the shoulder and the pin tool.

42 Claims, 4 Drawing Sheets

FRICTION STIR WELDING APPARATUS AND ASSOCIATED THERMAL MANAGEMENT SYSTEMS AND METHODS

STATEMENT REGARDING FEDERALLY SPONSORED RESEARCH AND DEVELOPMENT

The U.S. Government may have certain rights in the present invention pursuant to U.S. Air Force Contract No. F33615-99-2-5215.

FIELD OF THE INVENTION

The present invention relates generally to a friction stir welding apparatus. More specifically, the present invention relates to a friction stir welding apparatus and associated thermal management systems and methods.

BACKGROUND OF THE INVENTION

Friction stir welding is a solid-state joining technique that is well known to those of ordinary skill in the art. Typically, friction stir welding is used to join difficult-to-weld metals, metal alloys (such as aluminum alloys, titanium alloys, nickel alloys, and the like), and other materials. For example, certain aluminum alloys are sensitive in a plasticized heat-affected zone, where the base metal reaches temperatures between solidus and liquidus during welding. In this heat-affected zone, partial melting at grain boundaries forms a network containing brittle compounds. As a result, weld ductility is substantially reduced. Likewise, other conventional joining techniques may create geometric distortions near a weld joint due to high temperature gradients induced in a workpiece during welding. These geometric distortions may cause warping and other dimensional defects in the workpiece, as well as residual stresses that may cause premature failure by cracking in the heat-affected zone or weld joint, lamellar tearing, or by stress-corrosion cracking in some metals and metal alloys.

Friction stir welding techniques overcome many of the problems associated with other conventional joining techniques. In friction stir welding, a rotating, cylindrical, non-consumable pin tool is plunged into a rigidly clamped workpiece and traversed along the joint to be welded. The pin tool is specially designed to provide a combination of frictional heat and thermo-mechanical working to accomplish the weld. As the pin tool is traversed along the joint to be welded, the plasticized metal, metal alloy, or other material is transferred from the leading edge of the pin tool to the trailing edge of the pin tool, forming a strong solid-state weld joint in the wake of the pin tool. During the friction stir welding of hard metals, metal alloys, and other materials, relatively high temperatures are generated in the pin tool, as well as the tool holder. These relatively high temperatures in the pin tool, in combination with relatively low temperatures in the workpiece, may result in a weld joint of poor quality and mechanical integrity, prone to defects and workpiece distortions. For example, solid-state welds, including inertia welds, translational friction welds, and the like, associated with titanium alloys, such as Ti17 and the like, are typically characterized by poor fracture toughness and impact strength. This is due, in part, to the relatively high cooling rate of such welds using conventional joining techniques, including conventional friction stir welding techniques.

Thus, what is needed are thermal management systems and methods that allow a workpiece to be controllably heated during friction stir welding, such that the temperatures in the workpiece more closely match the temperatures in the pin tool. In this manner, the cooling rate of a weld joint may be controlled. This would result in a weld joint of enhanced quality and mechanical integrity, free from defects and workpiece distortions and demonstrating improved fracture toughness, impact strength, and fatigue properties. This would also allow for enhanced pin tool temperature control in the event that a consumable pin tool is used and minimize problems associated with pin tool debris entrapment. Finally, pin tool wear would be reduced and pin tool life increased.

BRIEF SUMMARY OF THE INVENTION

In various embodiments, the present invention provides thermal management systems and methods that allow a workpiece to be controllably heated during friction stir welding, such that the temperatures in the workpiece more closely match the temperatures in the pin tool. In this manner, the cooling rate of a weld joint may be controlled. This results in a weld joint of enhanced quality and mechanical integrity, free from defects and workpiece distortions and demonstrating improved fracture toughness, impact strength, and fatigue properties. This also allows for enhanced pin tool temperature control in the event that a consumable pin tool is used and minimizes problems associated with pin tool debris entrapment. Finally, pin tool wear is reduced and pin tool life increased.

In one embodiment of the present invention, a friction stir welding apparatus operable for joining one or more similar or dissimilar materials forming a workpiece along a joint to be welded includes a pin tool apparatus selectively disposed adjacent to and in direct contact with a first surface of the workpiece along the joint to be welded and a heating member disposed adjacent to a second surface of the workpiece along the joint to be welded, the heating member operable for controllably heating at least a portion of the workpiece adjacent to the joint to be welded.

In another embodiment of the present invention, a thermal management system for use with a friction stir welding apparatus operable for joining one or more similar or dissimilar materials forming a workpiece along a joint to be welded includes a heating member disposed adjacent to a surface of the workpiece along the joint to be welded, the heating member operable for controllably heating at least a portion of the workpiece adjacent to the joint to be welded.

In a further embodiment of the present invention, a friction stir welding method for joining one or more similar or dissimilar materials forming a workpiece along a joint to be welded includes selectively disposing a pin tool apparatus adjacent to and in direct contact with a first surface of the workpiece along the joint to be welded, disposing a heating member adjacent to a second surface of the workpiece along the joint to be welded, and controllably heating at least a portion of the workpiece adjacent to the joint to be welded using the heating member.

In a still further embodiment of the present invention, a thermal management method for use with a friction stir welding method for joining one or more similar or dissimilar materials forming a workpiece along a joint to be welded includes disposing a heating member adjacent to a surface of the workpiece along the joint to be welded and controllably heating at least a portion of the workpiece adjacent to the joint to be welded using the heating member.

In a still further embodiment of the present invention, a friction stir welding apparatus operable for joining one or more similar or dissimilar materials forming a workpiece along a joint to be welded includes an annular spindle having an interior portion and an axis, the interior portion of the annular spindle at least partially defining one or more cooling channels, the one or more cooling channels operable for containing a cooling fluid. The friction stir welding apparatus also includes a shoulder disposed adjacent to the annular spindle and substantially aligned with the axis of the annular spindle and a pin tool disposed adjacent to the shoulder and substantially aligned with the axis of the annular spindle. The cooling fluid is operable for cooling at least one of the shoulder and the pin tool.

DETAILED DESCRIPTION OF THE INVENTION

Figure 1:
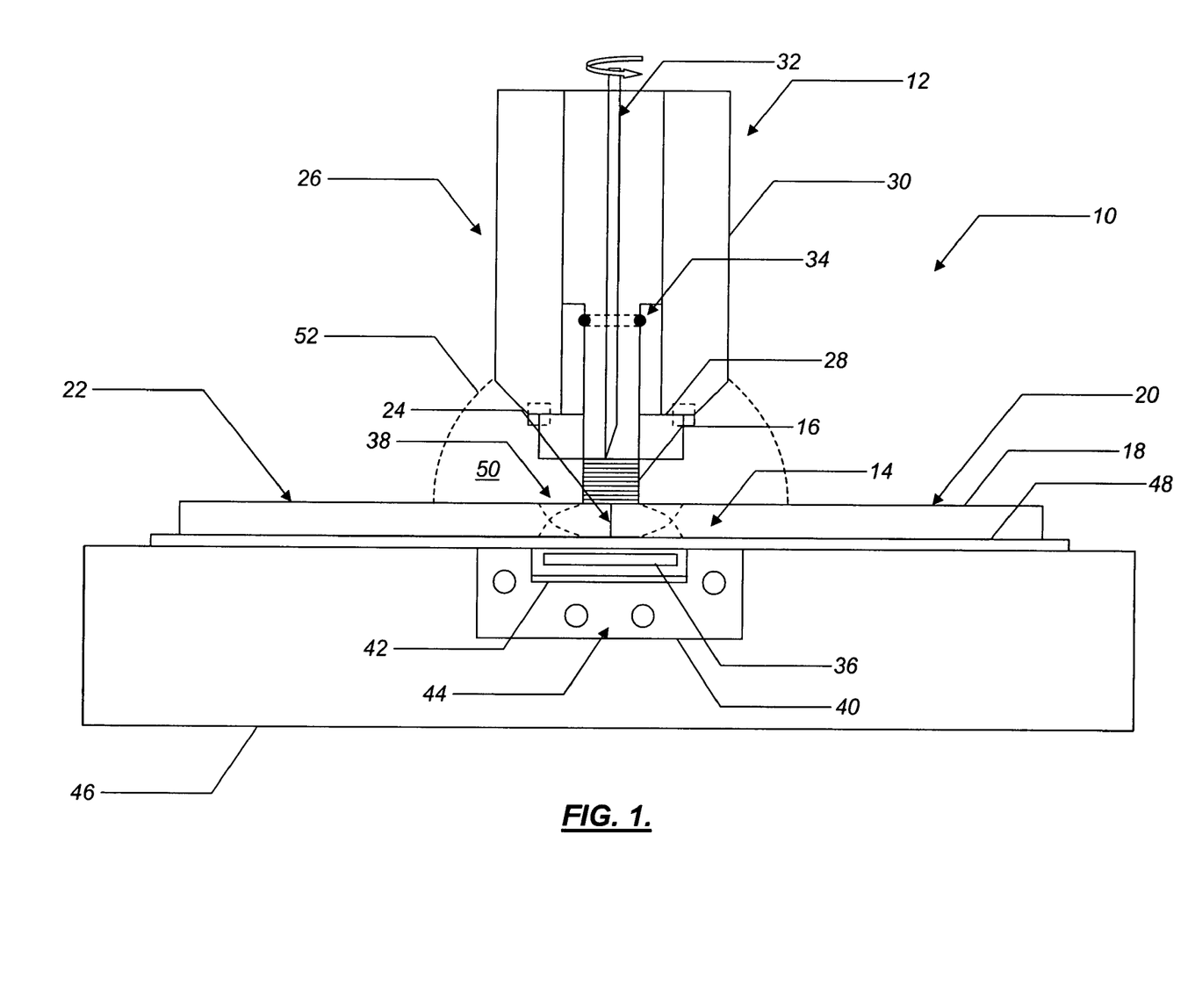
FIG. 1 is a sectional end view of one embodiment of the thermal management system for friction stir welding of the present invention, illustrating the use of a ceramic strip heater disposed adjacent to a joint to be welded and inert gas shielding.

Referring to FIG. 1, in one embodiment of the present invention, a friction stir welding apparatus 10 includes a conventional or novel pin tool apparatus 12 and a thermal management system 14. Optionally, elements of the thermal management system 14 are incorporated into the pin tool apparatus 12. The pin tool apparatus 12 includes a rotating pin tool 16 that is selectively plunged into a rigidly clamped workpiece 18 consisting of two similar or dissimilar materials 20,22 disposed adjacent to one another and forming a joint 24 to be welded. The materials 20,22 include, for example, one or more metals, metal alloys (such as aluminum alloys, titanium alloys, nickel alloys, or the like), or other materials. In a typical application, the workpiece 18 has a thickness of between about 0.04 inches and about 1.5 inches, and the joint 24 to be welded has a length of between about 1 inch and about 300 inches or longer. Other thicknesses and lengths may, however, be used. For example, the joint 24 to be welded may have an infinite length, have a complex path and/or curvature, be circumferential in nature, etc. Preferably, the pin tool 16 has a substantially cylindrical or conical shape and, optionally, includes a plurality of threads, truncations, and/or a radius tip. Conventional pin tools 16 are non-consumable, although a consumable pin tool 16 may be used. The pin tool 16 may be made of a material that is similar to or dissimilar from those comprising the workpiece 18, such as a refractory metal alloy (a molybdenum alloy, a tungsten alloy, etc.) or the like. For a full-penetration weld, the diameter and length of the pin tool 16 are about equal to the thickness of the workpiece 18, before being partially or wholly incorporated into the weld in the case of a consumable pin tool 16. For a partial-penetration weld, the diameter and length of the pin tool 16 are smaller than the thickness of the workpiece 18, before being partially or wholly incorporated into the weld in the case of a consumable pin tool 16. Typically, the pin tool 16 is rotated at a speed of between about 100 rpm and about 1,500 rpm during friction stir welding, depending upon the materials 20,22 to be welded, via a drive mechanism (not shown). It should be noted that the rotational speed of the pin tool 16 is also dependent upon the thickness of the workpiece 18 to be friction stir welded, with thinner sections requiring higher rotational speeds and thicker sections requiring lower rotational speeds.

The pin tool 16 at least partially protrudes from a tool holder 26 including, in part, an annular shoulder 28 and an annular spindle 30. Preferably, the shoulder 28 has a substantially cylindrical shape, although other suitable shapes may be used. Conventional shoulders 28, like conventional pin tools 16, are non-consumable, although a consumable shoulder 28 may be used. The shoulder 28 may be made of a material that is similar to or dissimilar from those comprising the workpiece 18, such as a refractory metal alloy (a molybdenum alloy, a tungsten alloy, etc.) or the like. The shoulder 28 may be non-rotating, or may rotate in coordination with or independent of the pin tool 16. Like the pin tool 16, the shoulder 28 is typically rotated at a speed of between about 100 rpm and about 1,500 rpm during friction stir welding, depending upon the materials 20,22 to be welded, via a drive mechanism (not shown). It should be noted that the rotational speed of the shoulder 28 is also dependent upon the thickness of the workpiece 18 to be friction stir welded, with thinner sections requiring higher rotational speeds and thicker sections requiring lower rotational speeds. The shoulder 28 has an inside diameter that is slightly larger than the diameter of the pin tool 16 in order to accommodate the pin tool 16 without restriction and/or binding. The shoulder 28 has an outside diameter that is about two to three times larger than the diameter of the pin tool 16, although any suitable dimensions may be used. The shoulder 28 protrudes from the tool holder 26 by about 0.5 inches, although any suitable dimensions may be used. Both the shoulder 28 and the pin tool 16 may be selectively and continuously extendable from/retractable into the tool holder 26, either in coordination with or independent of one another. Accordingly, both the shoulder 28 and the pin tool 16 may incorporate and use axial load feedback control.

Preferably, the spindle 30 has a substantially cylindrical shape, although other suitable shapes may be used. The spindle 30 has an inside diameter that is slightly larger than the diameter of the pin tool 16 and the drive mechanism (not shown) in order to prevent restriction and/or binding. In the case of a consumable pin tool 16, the length of the spindle 30 is as short as possible in order to prevent spindle run-out, which may affect the positional accuracy of the pin tool 16, as well as weld quality/soundness. However, the length of the spindle 30 is long enough to allow a sufficient length of feedstock (i.e. pin tool 16) to be provided in order to produce a weld of useful continuous length. Preferably, the spindle 30 is made of tool steel or the like. The inside surface of the spindle 30 defines one or more channels 32 through which a cooling fluid flows. The one or more channels 32 may be partially or wholly aligned with the axis of the spindle 30. Alternatively, a single channel 32 may be substantially co-axial with the axis of the spindle 30. The cooling fluid is operable for cooling the pin tool 16 and/or the shoulder 28 and consists of air, an inert gas, water, cooling oil, ethylene glycol, or any other suitable cooling fluid. Preferably, in the case of a consumable pin tool 16, the temperature of the tip of the pin tool 16 is maintained in a range in which the pin tool material is substantially plastic. For example, the temperature of the tip of the pin tool 16 is maintained in a range of between about 1,650 degrees F. and about 1,990 degrees F. for titanium alloys and about 1,800 degrees F. and about 2,200 degrees F. for steel and nickel alloys. Likewise, if a consumable shoulder 28 is used, the temperature of the shoulder 28 is maintained in a range in which the shoulder material is substantially plastic. For example, the temperature of the shoulder 28 is maintained in a range of between about 1,650 degrees F. and about 1,990 degrees F. for titanium alloys and about 1,800 degrees F. and about 2,200 degrees F. for steel and nickel alloys. In order to contain the cooling fluid within the one or more channels 32 in the presence of rotating components, one or more seals 34, such as o-ring seals or the like, are used. It should be noted that a cooling jacket (not shown) containing the cooling fluid may also be disposed about the spindle 30 and used to cool the pin tool 16 and/or the shoulder 28. The cooling fluid flow rate to the one or more channels 32 and the cooling jacket (not shown) may be the same or different, and may be controlled using one or more temperature feedback loops or the like. Other suitable cooling mechanisms well known to those of ordinary skill in the art may also be used.

Although one preferred embodiment of the pin tool apparatus 12 has been illustrated and described above, it should be noted that any suitable components or apparatuses that provide a rotating or non-rotating, moveable or non-moveable, consumable or non-consumable pin tool 16 may be used.

As described above, the pin tool 16 is plunged into the rigidly clamped workpiece 18 and traversed along the joint 24 to be welded. The pin tool 16 provides a combination of frictional heat and thermo-mechanical working to accomplish the weld. As the pin tool 16 is traversed along the joint 24 to be welded, the plasticized metal, metal alloy, or other material is transferred from the leading edge of the pin tool 16 to the trailing edge of the pin tool 16, forming a strong solid-state weld joint 24 in the wake of the pin tool 16. In the case of a consumable pin tool 16, the pin tool 16 is substantially continuously fed into the joint 24 to be welded and is incorporated into the joint 24 as filler material. Preferably, the pin tool 16 is fed into the joint 24 at a rate that is sufficient to fill the joint preparation (e.g. square groove, v-groove, or j-groove) without underfill or substantial overfill.

Figure 2:
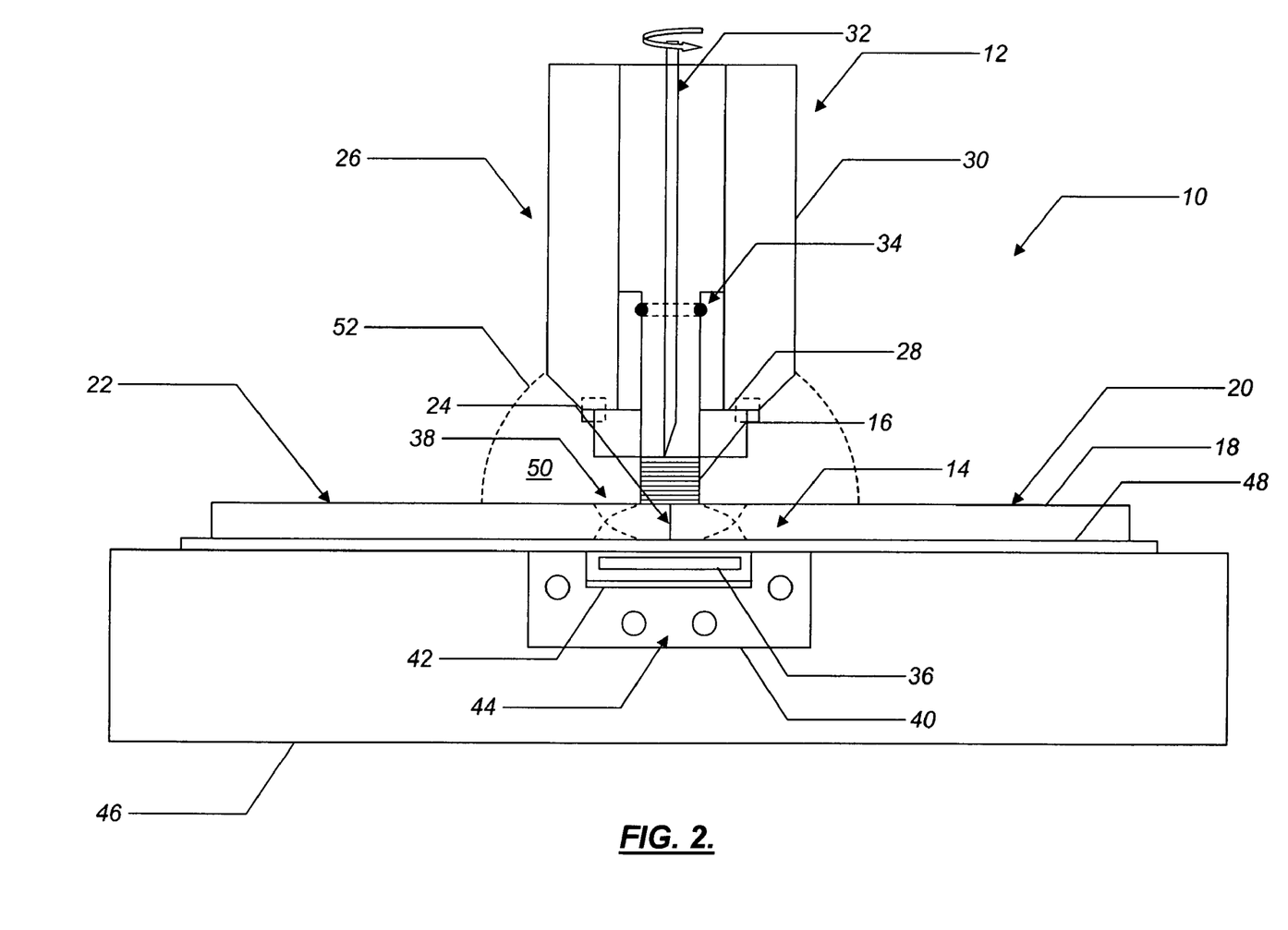
FIG. 2 is a sectional end view of another embodiment of the thermal management system for friction stir welding of the present invention, illustrating the use of a ceramic strip heater disposed adjacent to a joint to be welded and powder shielding.

The thermal management system 14 includes a heating member 36 disposed directly or indirectly adjacent to the joint 24 to be welded, opposite the pin tool apparatus 12 relative to the workpiece 18. The heating member 36 consists of a ceramic strip heater (made of an alumina or silica outer casing surrounding a heating element) or the like, capable of being heated to a temperature of between about 500 degrees F. and about 2,500 degrees F., depending on the materials involved. Preferably, the heating member 36 has a width that is about equal to the width of the portion 38 of the workpiece 18 that is affected by the welding process and a length that is about equal to the length of the joint 24 to be welded. In general, thinner plates may be joined with heater strips that are relatively narrow, while thicker plates may be joined with heater strips that are relatively wide. The object is to heat the width at the root of the joint 24 to be welded that is stirred without excessively heating the surrounding material and causing unnecessary thermal expansion and undesirable distortions. In an exemplary embodiment of the present invention, the width of the heating member 36 is between about 0.125 inches and about 1.5 inches, depending upon the base material thickness, thermal conductivity, and high-temperature strength. Other suitable dimensions may be used. The heating member 36 is disposed within a recess formed in a cooling member 40 and is partially or wholly surrounded by a compliant insulation layer 42. The cooling member 40 consists of a copper chill block or the like. In an exemplary embodiment of the present invention, the thickness of the compliant insulation layer 42 is between about 0.02 inches and about 0.125 inches, although other suitable dimensions may be used. The cooling member 40 includes one or more cooling passages 44 through which a cooling fluid flows. The cooling fluid is operable for controlling the temperature of the heating member 36 and, in combination with the compliant insulation layer 42, insulating the other components of the thermal management system 14 and the friction stir welding apparatus 10 from the heat generated by the heating member 36. The cooling fluid consists of air, an inert gas, water, cooling oil, ethylene glycol, or any other suitable cooling fluid. Preferably, the cooling member 40, the compliant insulation layer 42, and the heating member 36 are collectively disposed within a recess formed in a substantially rigid plate 46, such as a steel plate or the like, forming a welding table on which the workpiece 18 is disposed. Optionally, a hard metal backing sheet 48 is disposed between the surface of the substantially rigid plate 46 and the heating member 36 and the workpiece 18. Typically, the hard metal backing sheet 48 is made of a molybdenum alloy, a tungsten alloy, or the like, has a width of between about 0.125 inches and about 1 inch, and has a thickness of between about 0.032 inches and about 0.05 inches. Other suitable dimensions may be used. Preferably, the volume 50 surrounding the joint 24 to be welded adjacent to the substantially rigid plate 46 and/or the hard metal backing sheet 48 is shielded from the surrounding atmosphere by a shielding mechanism 52, such as an inert gas shielding mechanism (FIG. 1) (using argon, helium, an argon/helium mixture, etc.), an inert powder shielding mechanism (FIG. 2) (using a composition similar to the fluxes used for conventional submerged arc welding, a custom composition engineered specifically for the base materials to be joined, etc.), or the like. This shielding mechanism 52 is required because, during the welding of certain materials, such as titanium alloys and the like, the materials may oxidize in the presence of the surrounding atmosphere and the resulting oxides may become entrapped in the weld, compromising weld quality/soundness. It should be noted that any suitable shielding mechanisms 52 and/or atmospheric controls may be used.

As described above, the thermal management system 14 allows the workpiece 18 to be controllably heated during friction stir welding, such that the temperatures in the workpiece 18 more closely match the temperatures in the pin tool 16. In this manner, the cooling rate of the weld joint 24 may be controlled. This results in a weld joint 24 of enhanced quality and mechanical integrity, free from defects and workpiece distortions and demonstrating improved fracture toughness, impact strength, and fatigue properties. This also allows for enhanced pin tool temperature control in the event that a consumable pin tool 16 is used and minimizes problems associated with pin tool debris entrapment. Finally, pin tool wear is reduced and pin tool life increased.

Figure 3:
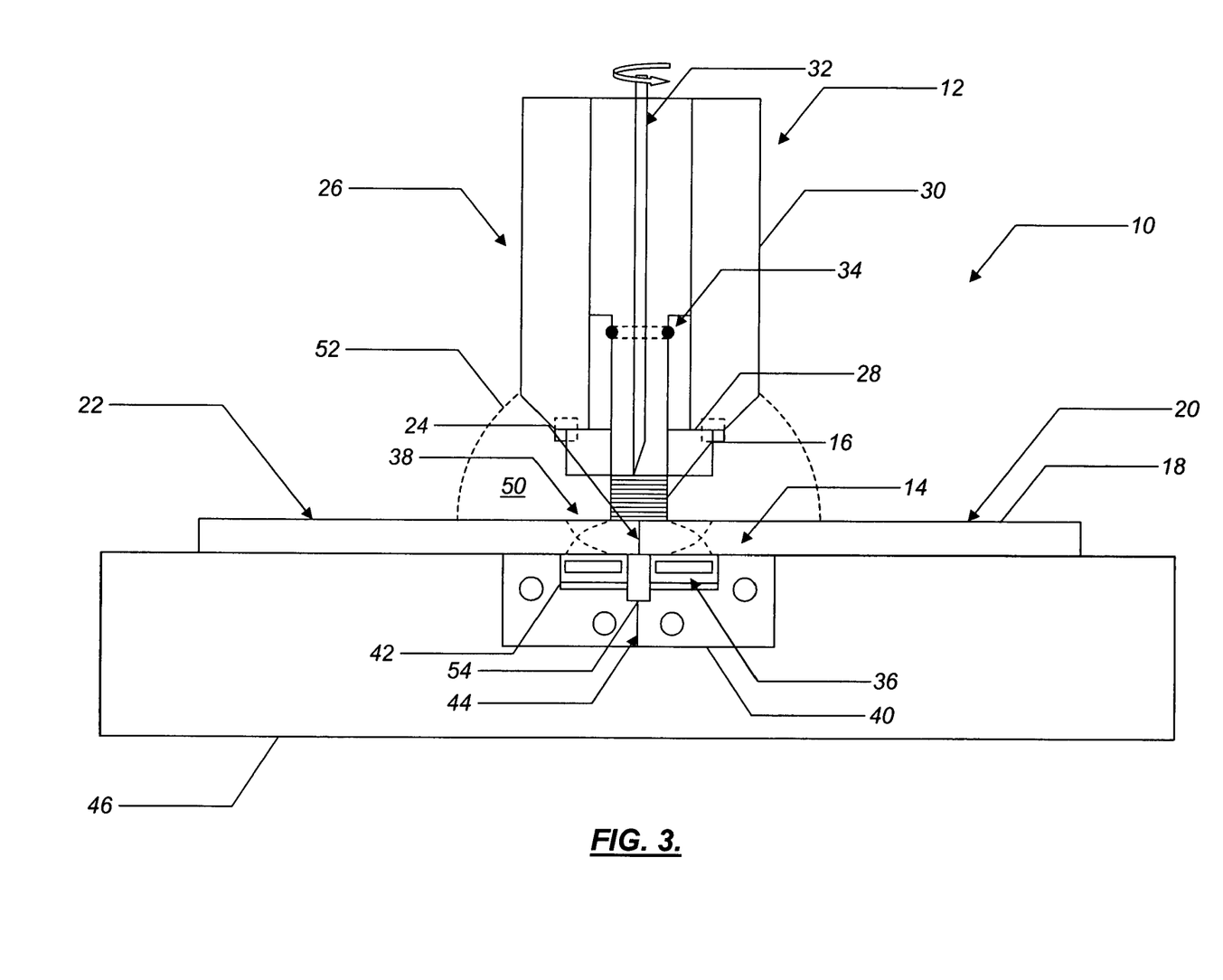
FIG. 3 is a sectional end view of a further embodiment of the thermal management system for friction stir welding of the present invention, illustrating the use of a plurality of ceramic strip heaters and a hard metal backing strip disposed adjacent to a joint to be welded and either inert gas or powder shielding.

Referring to FIG. 3, in another embodiment of the present invention, the friction stir welding apparatus 10 is as described above (FIGS. 1 and 2), except that the thermal management system 14 includes a plurality of heating members 36 disposed directly or indirectly adjacent to the joint 24 to be welded, rather than the single heating member 36 disposed directly or indirectly adjacent to the joint 24 to be welded, opposite the pin tool apparatus 12 relative to the workpiece 18. Each of the plurality of heating members 36 consists of a ceramic strip heater (made of an alumina or silica outer casing surrounding a heating element) or the like, capable of being heated to a temperature of between about 500 degrees F. and about 2,500 degrees F., depending on the materials involved. Preferably, each of the plurality of heating members 36 has a width that is less than the width of the portion 38 of the workpiece 18 that is affected by the welding process and a length that is about equal to the length of the joint 24 to be welded. In an exemplary embodiment of the present invention, the width of each of the plurality of heating members 36 is between about 0.125 inches and about 0.75 inches, depending upon the base material thickness, thermal conductivity, and high-temperature strength. Other suitable dimensions may be used. The thermal management system 14 also includes a hard metal backing strip 54 disposed directly adjacent to the joint 24 to be welded, opposite the pin tool apparatus 12 relative to the workpiece 18. The hard metal backing strip 54 is made of a substantially rigid material that is capable of withstanding the relatively high temperatures generated by the plurality of heating members 36, such as a molybdenum alloy, a tungsten alloy, or the like. Preferably, the hard metal backing strip 54 has a width that is less than the width of the portion 38 of the workpiece 18 that is affected by the welding process and a length that is about equal to the length of the joint 24 to be welded. In an exemplary embodiment of the present invention, the width of the hard metal backing strip 54 is between about 0.125 inches and about 1 inch, and the thickness of the hard metal backing strip 54 is between about 0.032 inches and about 0.25 inches. Other suitable dimensions may be used. The hard metal backing strip 54 serves a similar function to the hard metal backing sheet 48 (FIGS. 1 and 2) described above, supporting the joint 24 to be welded.

Figure 4:
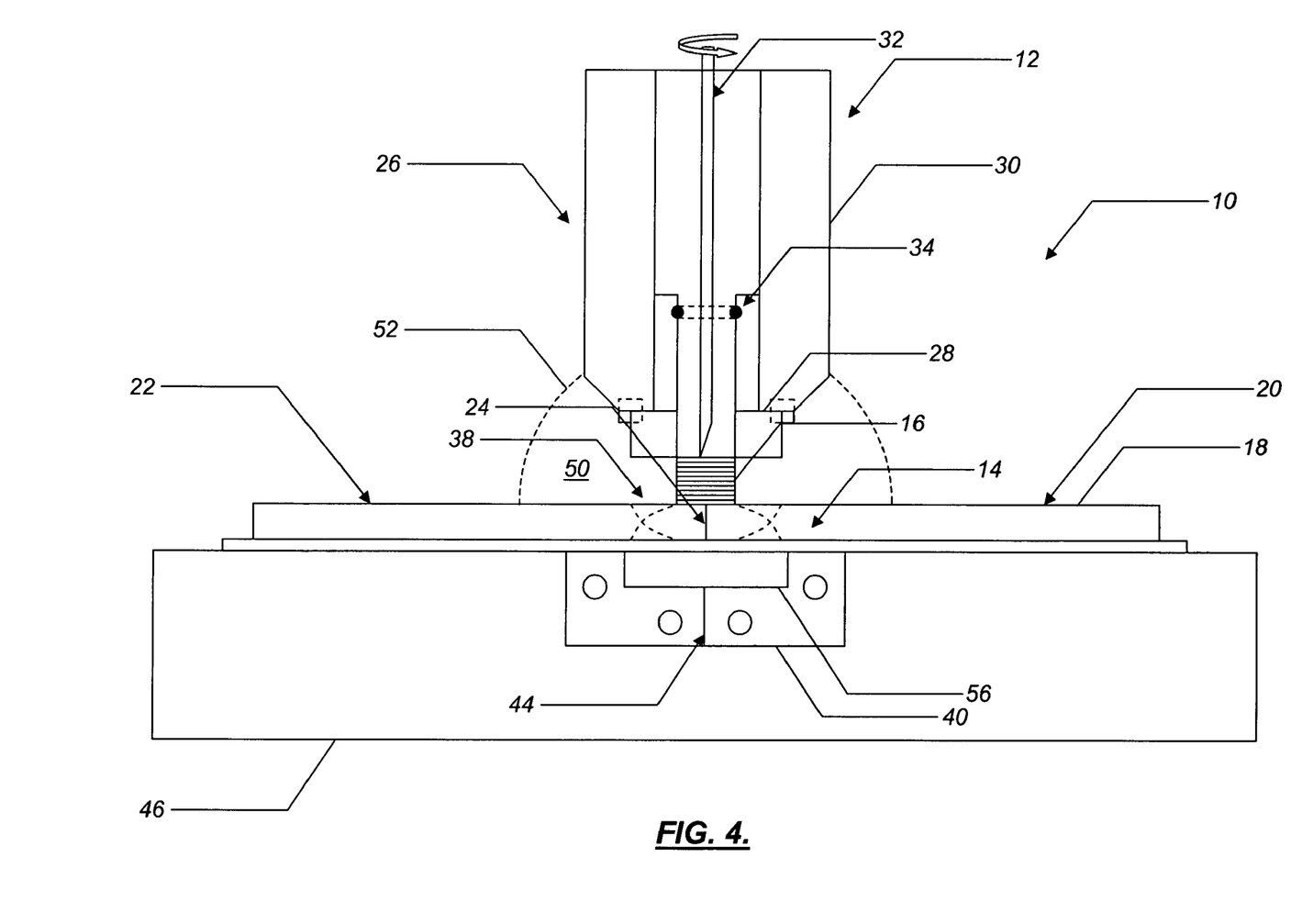
FIG. 4 is a sectional end view of a still further embodiment of the thermal management system for friction stir welding of the present invention, illustrating the use of a hard metal backing strip that is resistance heated disposed adjacent to a joint to be welded and either inert gas or powder shielding.

Referring to FIG. 4, in a further embodiment of the present invention, the friction stir welding apparatus 10 is as described above (FIGS. 1 and 2), except that the thermal management system 14 includes a resistance-heated hard metal backing strip 56 disposed directly adjacent to the joint 24 to be welded, rather than the single heating member 36 disposed directly or indirectly adjacent to the joint 24 to be welded, opposite the pin tool apparatus 12 relative to the workpiece 18. The resistance-heated hard metal backing strip 56 is made of a substantially rigid material, such as a molybdenum alloy, a tungsten alloy, or the like, and is capable of being heated to a temperature of between about 500 degrees F. and about 2,500 degrees F., depending on the materials involved. Preferably, the resistance-heated hard metal backing strip 56 has a width that is about equal to the width of the portion 38 of the workpiece 18 that is affected by the welding process and a length that is about equal to the length of the joint 24 to be welded. In an exemplary embodiment of the present invention, the width of the resistance-heated hard metal backing strip 56 is between about 0.25 inches and about 3 inches, and the thickness of the resistance-heated hard metal backing strip 56 is between about 0.032 inches and about 0.25 inches. Other suitable dimensions may be used. The resistance-heated hard metal backing strip 56 serves a similar function to the hard metal backing sheet 48 (FIGS. 1 and 2) described above, supporting the joint 24 to be welded.

Although the present invention has been illustrated and described with reference to preferred embodiments and examples thereof, it will be readily apparent to those of ordinary skill in the art that other embodiments and examples may perform similar functions and/or achieve similar results. All such equivalent embodiments and examples are within the spirit and scope of the present invention and are intended to be covered by the following claims.

What is claimed is:

1. A friction stir welding apparatus operable for joining one or more similar or dissimilar materials forming a workpiece along a joint to be welded, the friction stir welding apparatus comprising:
   a pin tool apparatus selectively disposed adjacent to and in direct contact with a first surface of the workpiece along the joint to be welded;
   a heating member disposed adjacent to a second surface of the workpiece along the joint to be welded, the heating member operable for controllably heating at least a portion of the workpiece adjacent to the joint to be welded, wherein the heating member is operable for generating a temperature of between about 500 degrees F. and about 2,500 degrees F.;
   a cooling member disposed about at least a portion of the heating member, the cooling member operable for controlling a temperature of the heating member; and
   a substantially rigid plate disposed about at least a portion of the cooling member, the substantially rigid plate operable for supporting at least a portion of the workpiece.

2. The friction stir welding apparatus of claim 1, wherein the heating member comprises a heating member selected from the group consisting of a ceramic strip heater, a plurality of ceramic strip beaters, and a resistance-heated hard metal backing strip.

3. The friction stir welding apparatus of claim 1, wherein the heating member has a length that is about equal to a length of the joint to be welded.

4. The friction stir welding apparatus of claim 1, wherein an interior surface of the cooling member defines one or more cooling passages, the one or more cooling passages operable for containing a cooling fluid.

5. The friction stir welding apparatus of claim 4, wherein the cooling fluid comprises a cooling fluid selected from the group consisting of air, an inert gas, water, cooling oil, and ethylene glycol.

6. The friction stir welding apparatus of claim 1, further comprising a compliant insulation layer disposed about at least a portion of the heating member, between at least a portion of the heating member and at least a portion of the cooling member, the compliant insulation member operable for insulating the heating member.

7. The friction stir welding apparatus of claim 1, further comprising a hard metal backing strip disposed adjacent to the second surface of the workpiece along the joint to be welded, the hard metal backing strip operable for supporting at least a portion of the workpiece adjacent to the joint to be welded.

8. The friction stir welding apparatus of claim 1, further comprising a hard metal backing sheet disposed between the second surface of the workpiece and the heating member, the hard metal backing sheet operable for supporting at least a portion of the workpiece.

9. The friction stir welding apparatus of claim 1, further comprising a shielding mechanism disposed about the joint to be welded adjacent to the first surface of the workpiece, the shielding mechanism operable for shielding the joint to be welded from a surrounding atmosphere.

10. The friction stir welding apparatus of claim 9, wherein the shielding mechanism comprises a shielding mechanism selected from the group consisting of an inert gas shielding mechanism and an inert powder shielding mechanism.

11. The friction stir welding apparatus of claim 1, wherein the pin tool apparatus comprises a consumable pin tool apparatus.

12. A thermal management system for use with a friction stir welding apparatus operable for joining one or more similar or dissimilar materials forming a workpiece along a joint to be welded, the thermal management system comprising:
a heating member disposed adjacent to a surface of the workpiece along the joint to be welded, the heating member operable for controllably heating at least a portion of the workpiece adjacent to the joint to be welded, wherein the heating member is operable for generating a temperature of between about 500 degrees F. and about 2,500 degrees F.;
a cooling member disposed about at least a portion of the heating member, the cooling member operable for controlling a temperature of the heating member; and
a substantially rigid plate disposed about at least a portion of the cooling member, the substantially rigid plate operable for supporting at least a portion of the workpiece.

13. The thermal management system of claim 12, wherein the heating member comprises a heating member selected from the group consisting of a ceramic strip heater, a plurality of ceramic strip heaters, and a resistance-heated hard metal backing strip.

14. The thermal management system of claim 12, wherein the heating member has a length that is about equal to a length of the joint to be welded.

15. The thermal management system of claim 12, wherein an interior surface of the cooling member defines one or more cooling passages, the one or more cooling passages operable for containing a cooling fluid.

16. The thermal management system of claim 15, wherein the cooling fluid comprises a cooling fluid selected from the group consisting of air, an inert gas, water, cooling oil, and ethylene glycol.

17. The thermal management system of claim 12, further comprising a compliant insulation layer disposed about at least a portion of the heating member, between at least a portion of the heating member and at least a portion of the cooling member, the compliant insulation member operable for insulating the heating member.

18. The thermal management system of claim 12, further comprising a hard metal backing strip disposed adjacent to the surface of the workpiece along the joint to be welded, the hard metal backing strip operable for supporting at least a portion of the workpiece adjacent to the joint to be welded.

19. The thermal management system of claim 12, further comprising a bard metal backing sheet disposed between the surface of the workpiece and the heating member, the hard metal backing abed operable for supporting at least a portion of the workpiece.

20. The thermal management system of claim 12, further comprising a shielding mechanism disposed about the joint to be welded adjacent to another surface of the workpiece, the shielding mechanism operable for shielding the joint to be welded from a surrounding atmosphere.

21. The thermal management system of claim 20, wherein the shielding mechanism comprises a shielding mechanism selected from the group consisting of an inert gas shielding mechanism and an inert powder shielding mechanism.

22. A friction stir welding method for joining one or more similar or dissimilar materials forming a workpiece along a joint to be welded, the friction stir welding method comprising:
selectively disposing a pin tool apparatus adjacent to and in direct contact with a first surface of the workpiece along the joint to be welded;
disposing a heating member adjacent to a second surface of the workpiece along the joint to be welded;
controllably heating at least a portion of the workpiece adjacent to the joint to be welded to a temperature of between about 500 degrees F. and about 2,500 degrees F. using the heating member;
disposing a cooling member about at least a portion of the heating member, the cooling member operable for controlling a temperature of the heating member; and
disposing a substantially rigid plate about at least a portion of the cooling member, the substantially rigid plate operable for supporting at least a portion of the workpiece.

23. The friction stir welding method of claim 22, wherein the heating member comprises a heating member selected from the group consisting of a ceramic strip heater, a plurality of ceramic strip heaters, and a resistance-heated bard metal backing strip.

24. The friction stir welding method of claim 22, wherein the heating member has a length that is about equal to a length of the joint to be welded.

25. The friction stir welding method of claim 22, wherein an interior suffice of the cooling member defines one or more cooling passages, the one or more cooling passages operable for containing a cooling fluid.

26. The friction stir welding method of claim 25, wherein the cooling fluid comprises a cooling fluid selected from the group consisting of air, an inert gas, water, cooling oil, and ethylene glycol.

27. The friction stir welding method of claim 22, further comprising disposing a compliant insulation layer about at least a portion of the heating member, between at least a portion of the heating member and at least a portion of the cooling member, the compliant insulation member operable for insulating the heating member.

28. The friction stir welding method of claim 22, further comprising disposing a hard metal backing strip adjacent to the second surface of the workpiece along the joint to be welded, the hard metal backing strip operable for supporting at least a portion of the workpiece adjacent to the joint to be welded.

29. The friction stir welding method of claim 22, further comprising disposing a hard metal backing sheet between the second surface of the workpiece and the heating member, the hard metal backing sheet operable for supporting at least a portion of the workpiece.

30. The friction stir welding method of claim 22, further comprising disposing a shielding mechanism about the joint to be welded adjacent to the first surface of the workpiece, the shielding mechanism operable for shielding the joint to be welded from a surrounding atmosphere.

31. The friction stir welding method of claim 30, wherein the shielding mechanism comprises a shielding mechanism selected from the group consisting of an inert gas shielding mechanism and an inert powder shielding mechanism.

32. The friction stir welding method of claim 22, wherein the pin tool apparatus comprises a consumable pin tool apparatus.

33. A thermal management method for use with a friction stir welding method for joining one or more similar or dissimilar materials forming a workpiece along a joint to be welded, the thermal management method comprising:
disposing a heating member adjacent to a surface of the workpiece along the joint to be welded;
controllably heating at least a portion of the workpiece adjacent to the joint to be welded to a temperature of between about 500 degrees F. and about 2,500 degrees F. using the heating member;
disposing a cooling member about at least a portion of the heating member, the cooling member operable for controlling a temperature of the heating member; and
disposing a substantially rigid plate about at least a portion of the cooling member, the substantially rigid plate operable for supporting at least a portion of the workpiece.

34. The thermal management method of claim 33, wherein the heating member comprises a heating member selected from the group consisting of a ceramic strip heater, a plurality of ceramic strip heaters, and a resistance-heated hard metal backing strip.

35. The thermal management method of claim 33, wherein the heating member has a length that is about equal to a length of the joint to be welded.

36. The thermal management method of claim 33, wherein an interior surface of the cooling member defines one or more cooling passages, the one or more cooling passages operable for containing a cooling fluid.

37. The thermal management method of claim 36, wherein the cooling fluid comprises a cooling fluid selected from the group consisting of air, an inert gas, water. cooling oil, and ethylene glycol.

38. The thermal management method of claim 33, further comprising disposing a compliant insulation layer about at least a portion of the heating member, between at least a portion of the heating member and at least a portion of the cooling member, the compliant insulation member operable for insulating the heating member.

39. The thermal management method of claim 33, further comprising disposing a hard metal backing strip adjacent to the surface of the workpiece along the joint to be welded, the hard metal backing strip operable for supporting at least a portion of the workpiece adjacent to the joint to be welded.

40. The thermal management method of claim 33, further comprising disposing a hard metal backing sheet between the surface of the workpiece and the heating member, the hard metal backing sheet operable for supporting at least a portion of the workpiece.

41. The thermal management method of claim 33, further comprising disposing a shielding mechanism about the joint to be welded adjacent to another surface of the workpiece, the shielding mechanism operable for shielding the joint to be welded from a surrounding atmosphere.

42. The thermal management method of claim 41, wherein the shielding mechanism comprises a shielding mechanism selected from the group consisting of an inert gas shielding mechanism and an inert powder shielding mechanism.

* * * * *